(12) United States Patent
Ray et al.

(10) Patent No.: US 6,224,084 B1
(45) Date of Patent: May 1, 2001

(54) TRAILER COUPLER

(76) Inventors: Ross Allen Ray, 250 Oniel Creek Rd.;
Steven D. Vermillion, 411 E. Evergreen Dr., both of Kalispell, MT (US) 59901

( * ) Notice: Subject to any disclaimer, the term of this patent is extended or adjusted under 35 U.S.C. 154(b) by 0 days.

(21) Appl. No.: 09/511,172

(22) Filed: Feb. 22, 2000

Related U.S. Application Data (63) Continuation-in-part of application No. 09/328,966, filed on Jun. 9, 1999.

(51) Int. Cl.⁷ ....................................................... B60D 1/36
(52) U.S. Cl. ............................................ 280/508; 280/512
(58) Field of Search .................................. 280/504, 511, 280/512, 508, 509, 477

(56) References Cited

U.S. PATENT DOCUMENTS

| | | |
|---|---|---|
| 1,335,211 * | 3/1920 | Walker . |
| 1,336,181 | 4/1920 | Anderson . |
| 1,810,592 | 6/1931 | Billstein . |
| 2,292,751 | 8/1942 | Forney . |
| 2,475,878 * | 7/1949 | Clark et al. . |
| 2,676,034 | 4/1954 | Tracey . |
| 2,904,348 | 9/1959 | Quastad . |
| 3,037,794 | 6/1962 | Richman, Jr. . |
| 3,046,038 | 7/1962 | Hollis . |
| 3,420,549 | 1/1969 | Robinson . |
| 3,658,363 | 4/1972 | Marler . |
| 3,860,267 | 1/1975 | Lyons . |
| 4,042,256 | 8/1977 | Lepp . |
| 4,792,151 | 12/1988 | Feld . |
| 4,799,705 | 1/1989 | Janes et al. . |
| 4,802,686 | 2/1989 | Isreal . |
| 5,205,666 | 4/1993 | Hollis . |
| 5,997,025 | 12/1999 | Wisecarver . |

* cited by examiner

Primary Examiner—Brian L. Johnson
Assistant Examiner—Avraham H. Lerner
(74) Attorney, Agent, or Firm—Wells, St. John, Roberts, Gregory & Matkin, P.S.

(57) ABSTRACT

A trailer coupler is described in which a pair of elongated hitch capturing members, each having a hitch socket part at a forward end are mounted to a base member for selective movement forward and rearwardly between a forwardly extended and open hitch receiving position wherein the hitch socket parts are separated and a rearwardly retracted and closed hitch capturing position wherein the hitch socket parts are closed together. A hitch positioner member is movably mounted to the base member and including a hitch abutment surface positioned between the hitch capturing members in the forwardly extended and open hitch receiving position. The hitch positioner member is connected to at least one of the hitch capturing members to move the hitch capturing member rearwardly in response to engagement by a rearwardly moving hitch. Interacting cam surfaces on at least one of the hitch capturing members and base member are responsive to rearward motion of the hitch capturing members to move the hitch capturing members to the closed hitch capturing position responsive to rearward movement of the hitch capturing members.

21 Claims, 10 Drawing Sheets

TRAILER COUPLER

RELATED APPLICATIONS

This is a continuation-in-part of co-pending U.S. patent application Ser. No. 09/328,966, filed on Jun. 9, 1999.

TECHNICAL FIELD

The present invention relates to couplers for securing a towing vehicle to a towed vehicle.

BACKGROUND OF THE INVENTION

It is a difficult and often frustrating task to properly align the towing hitch on a vehicle with the hitch coupler on a trailer. The towing vehicle must be moved in a rearward direction to move the hitch, which is typically positioned on the rear of the vehicle and out of the operator's sight, into position under a hitch coupler, which is also typically out of the operator's sight range. If the vehicle backs too far, the coupler will often strike the vehicle, and may cause damage. This can occur especially if hitch and coupler alignment is improper.

A conventional hitch ball-type coupler must be lowered onto the vehicle hitch ball to complete the coupling operation. Likewise, the coupler must be raised to disconnect the coupler. This requires that the trailer tongue be lifted and lowered, further complicating the coupling and disconnecting operations.

The above have been continuing problems, and numerous attempts at solutions have met with only marginal success. Some solutions involve placement of a horizontal "V" shaped guide mounted to the trailer tongue, with the hitch coupler at the vertex of the "V" shape. The converging arms are intended to guide the hitch rearwardly to the coupler. However the outwardly extending arms are cumbersome and must be made very strong to avoid bending. Further, the typical "V" shaped guide does not complete the hitching operation but simply assists alignment of the hitch and coupler, so the trailer tongue still must be lifted and lowered as described above.

An improved coupler that includes some limited capability for guiding a hitch into position is shown in U.S. Pat. Nos. 5,205,666 to Hollis, and 3,658,363 to Marler. The Hollis and Marler couplers include pivoted jaws with internal cut-outs which, when pivoted together, will capture a hitch ball. When open, the jaws form a small "V" shape that might be used to a limited extent for guiding the hitch ball into the coupler as the towing vehicle moves rearwardly. In Hollis, the rearwardly moving hitch ball, if properly received in the "V" shape, might engage the open socket members and cause the jaws to close. In both Hollis and Marler, a jaw encasing housing can be pivoted down over the closed jaws to lock the jaws in the closed position.

While the Hollis and Marler couplers have the advantage of positively clasping the hitch, any potential guiding function is limited by the distance the pivoted jaws can separate. The "target" area for operator is thus enlarged only to a small degree. If the jaws were to be extended or made longer to increase the target area, the extended parts would project too far forwardly of the hitch and interfere with the bumper or hitch receiver on the towing vehicle.

Another approach to the problem was made in U.S. Pat. No. 2,292,751 to Forney. Like Hollis and Marler, Forney uses pivoted jaws to grip a hitch. But instead of a pivoted housing, Forney makes use of a slidable tube which is spring loaded to slide forwardly and lock the jaws closed over the engaged hitch member. Forney, by using pivoted jaws faces the same "small target" area experienced by Hollis. Additionally, the jaws do not evidently automatically close in response to rearward movement and engagement by the hitch.

Others facing similar problems have developed clasping hitch couplers that are of interest. U.S. Pat. No. 1,336,181 to Anderson, for example, shows a coupler with one pivoted jaw operable by a bolt arrangement that slides in cam slots formed in the jaws. The bolt arrangement is spring biased to hold the jaws in a hitch clasping position and must be pulled rearwardly to allow the jaws to open.

Other developments have also been made, examples of which are submitted for consideration, including:

U.S. Pat. No. 4,799,705 to Janes et. al.;
U.S. Pat. No. 3,420,549 to Robinson;
U.S. Pat. No. 3,037,794 to Richman, Jr.;
U.S. Pat. No. 2,904,348 to Quastad; and
U.S. Pat. No. 1,810,592 to Billstein.

Even though advancements have been made, as evidenced from the prior art, the problem faced by operators of towing vehicles of positioning or aligning a towing vehicle relative to a coupler for hitch connection purposes still remains.

The present invention has for a primary objective an improved solution to the above problems, by providing a coupler that will expand to a wide hitch receiving position, enabling a greater degree of initial misalignment between the hitch and coupler, and that will function to automatically close on the hitch as the towing vehicle is moved rearwardly.

A further objective is to provide such a coupler that will function as indicated and that will also enable connection and disconnection of the hitch and connector without requiring significant, if any, elevational movement of either member beyond initial adjustments to accommodate hitch height.

A still further objective is to provide such a connector that can be securely locked on a hitch.

A yet further objective is to provide such a connector that has few moving parts and that is simple to operate.

The above and yet further objectives and advantages will become evident from the following description which, taken with the accompanying drawings and scope-defining claims, describe the presently known best mode for carrying out the present invention.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

General aspects of the present invention will first be given, followed by more detailed descriptions of preferred elements and relationships thereof.

In a first aspect of the trailer coupler 10, a pair of elongated hitch capturing members 14, each having a hitch socket part 26 at a forward end 31 are mounted to a base member 16. The base member 16 mounts the hitch capturing members 14 for selective movement forward and rearwardly between a forwardly extended and open hitch receiving position (FIG. 5) wherein the hitch socket parts 26 are separated; and a rearwardly retracted and closed hitch capturing position (FIGS. 3, 4) wherein the hitch socket parts 26 are closed together. A hitch positioner member 64 is movably mounted to the base member 16 and includes a hitch abutment surface 66 positioned between the hitch capturing members 14 in the forwardly extended and open hitch receiving position. The hitch positioner member 64 is movably positioned for forward and rearward movement with respect to at least one of the hitch capturing members 14 and is connected to the hitch capturing members 14 to move the hitch capturing members rearwardly in response to engagement by a rearwardly moving hitch 12. Interacting cam surfaces 42, 44 on at least one of the hitch capturing members 14 and base member 16 are responsive to rearward motion of the hitch capturing members to move the hitch capturing members 14 to the closed hitch capturing position responsive to rearward movement of the hitch capturing members.

In another aspect, the coupler 10 is comprised of an elongated tubular base member 16 having a forward open end 20 and a rearward end 18, configured for attachment to a trailer. A pair of elongated hitch capturing members 14, each including a forward hitch socket part 26 and a rearwardly extending arm 28 are slidably received for forward and rearward longitudinal movement within the base member 16. At least one of the arms 20 includes a first and a second cam surface 42, 44. A first cam actuator 46 is on the base member, positioned in slidable engagement with the first cam surface 42 to spread at least one of the hitch capturing members 14 laterally apart from the remaining hitch capturing member to a hitch receiving position responsive to forward movement of the hitch capturing members relative to the base member 16. A second cam surface actuator 48 is provided on the base member 14 positioned for slidable engagement with the second cam surface 44 to close the at least one hitch capturing member 14 laterally toward the remaining hitch capturing member to a hitch engaging position in response to rearward movement of the hitch capturing members relative to the base member. A hitch positioner 64 includes an abutment surface 66 spanning the hitch capturing members rearwardly adjacent the hitch socket parts 26 and is connected to the hitch capturing members 14 for forward and rearward movement with the hitch capturing members.

In a further aspect, the coupler is comprised of a tubular base 16 having a forward open end 20 and a rearward end 18, configured for attachment to a trailer. A pair of elongated hitch capturing members 14 each including a forward hitch socket part 26 and a rearwardly extending arm 28 slidably received for longitudinal movement within the tubular base 16. At least one of the arms 28 includes a first cam surface 42 and a second cam surface 44. A first cam surface actuator 46 is on the tubular base, positioned in slidable engagement with the first cam surface 42 to spread the hitch capturing members 14 laterally apart relative to one another at the forward hitch socket parts 26 to a hitch receiving position responsive to longitudinal movement of the hitch capturing members 14 in a forward direction with respect to the tubular base 16. A second cam surface actuator 48 is on the tubular base and is positioned for slidable engagement with the second cam surface 44 to move the hitch capturing members 14 laterally together at the forward hitch socket parts 26 to a closed hitch engaging position responsive to longitudinal movement of the hitch in a rearward direction with respect to the tubular base 16. A positioner member 64 is mounted to at least one of the hitch capturing members 14 and includes an abutment surface 66 positioned to span the hitch socket parts 26 in the forwardly extended and open hitch receiving position to engage a rearwardly moving hitch 12 and move the hitch capturing members rearwardly in response to the rearwardly moving hitch. The hitch capturing members 14 and positioner member 64 are interconnected such that rearward movement of one of the members 14 or 64 will cause similar movement of the remaining members 14 or 64.

Details of the various aspects generally described above will now be described.

The present coupler 10 is intended to guide a rearwardly moving conventional hitch 12 (see FIGS. 6–10) into position and to capture the hitch between a pair of hitch capturing members 14. The coupler is also intended to easily release the hitch 12. It is pointed out that the hitch 12 is not a part of the present invention, but is described simply to give a better understanding of the present trailer coupler 10.

For purposes of this disclosure, a ball-type hitch 12 is shown. This is a conventional form of hitch and is provided in various sizes which may be mounted to a towing vehicle at a receiver hitch, frame, or bumper (not shown). Though a ball-type hitch is shown, other hitch members such as the conventional pintle-type hitch could also be used without requiring other than obvious modifications of the present coupler.

Figure 1:
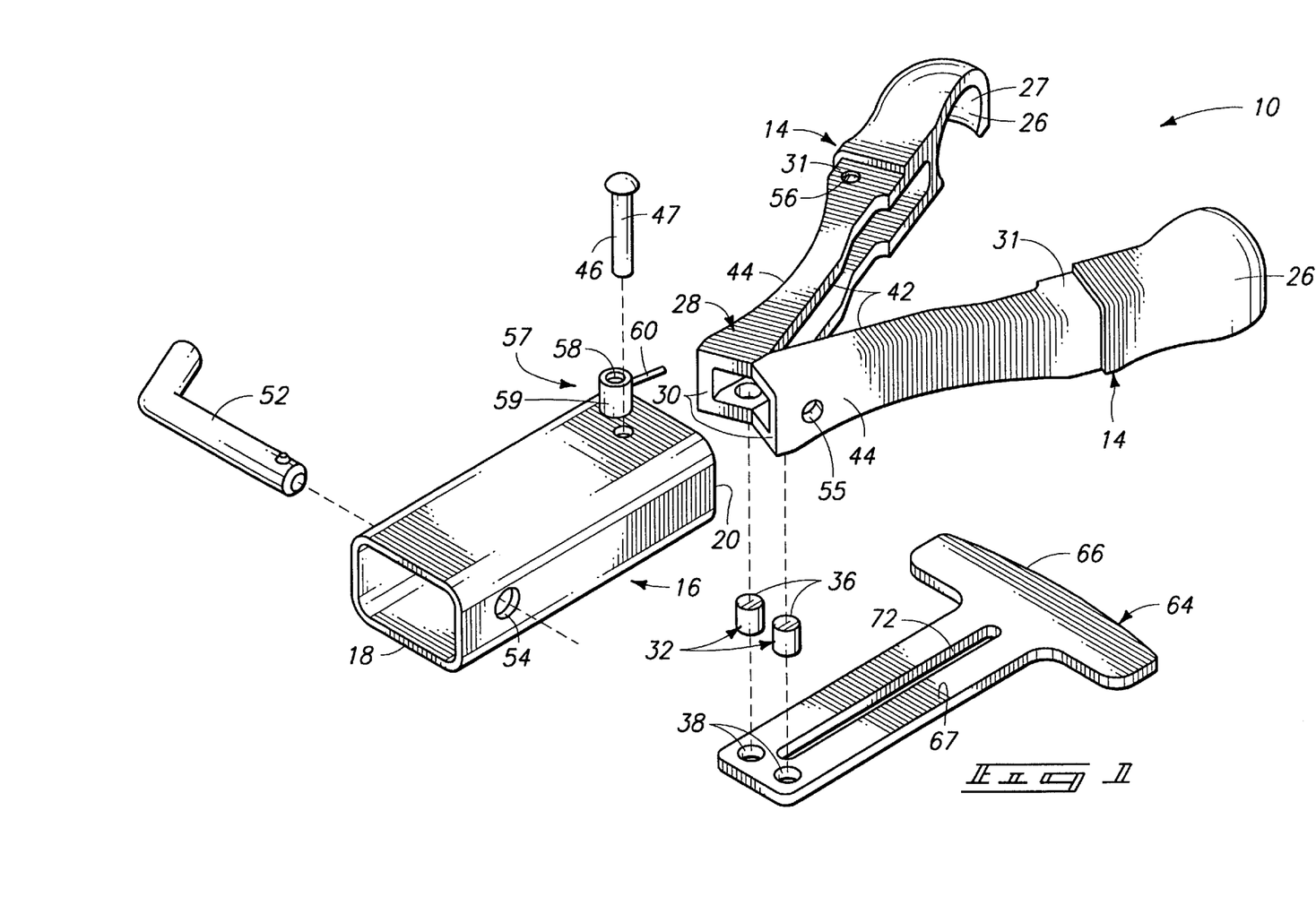
FIG. 1 is an exploded perspective view showing a preferred example of the present coupler components.

Referring now in greater detail to a preferred form of our invention, attention is firstly drawn to FIG. 1 of the drawings. There, the base member 16 is shown, preferably of tubular form, extending from rearward end 18 to open forward end 20. The base may be formed of rigid steel tube or channel that is open at the opposed ends 18 and 20.

The rearward end 18 is preferably configured for attachment to a trailer or other towed device or vehicle (partially shown by FIGS. 6–9). It is also preferable that the channel be rectangular in cross-section though other shapes could be used.

The hitch capturing members 14 are preferably formed of forged steel and are shown in FIG. 1. The preferred hitch capturing members 14 are for the most part mirror images of one another, so like features of both capturing members 14 will be assigned like reference numerals. Structural differences will be described and referenced individually.

Each of the hitch capturing members 14 includes a forward hitch socket part 26 and a rearwardly extending arm 28.

In the form illustrated, the hitch sockets 26 are semispherical recesses 27 formed at the forward ends of the hitch capturing members 14. The recesses 27 are shaped to be complementary to the hitch 12 and when closed together, capture the hitch 12 but leave a bottom opening that is complementary to the neck 13 of the hitch 12 (see FIG. 10). The hitch sockets 26 are formed to be slightly larger (when closed) than the hitch 12, to allow relatively free pivotal motion of the hitch, but to prevent its removal from the coupler 10.

Figure 2:
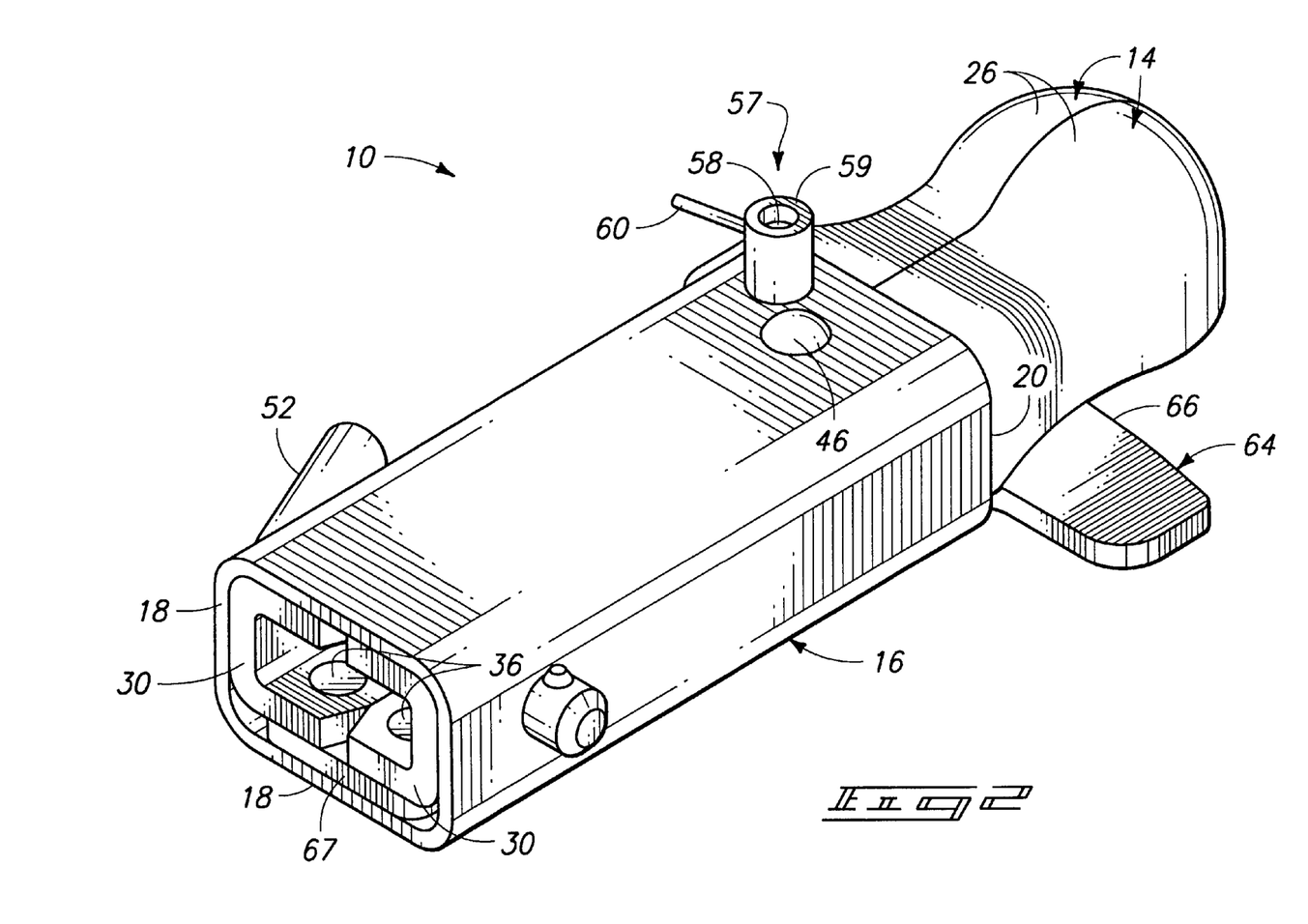
FIG. 2 is a perspective view showing the preferred coupler assembled and in a closed, hitch engaging position.
Figure 3:
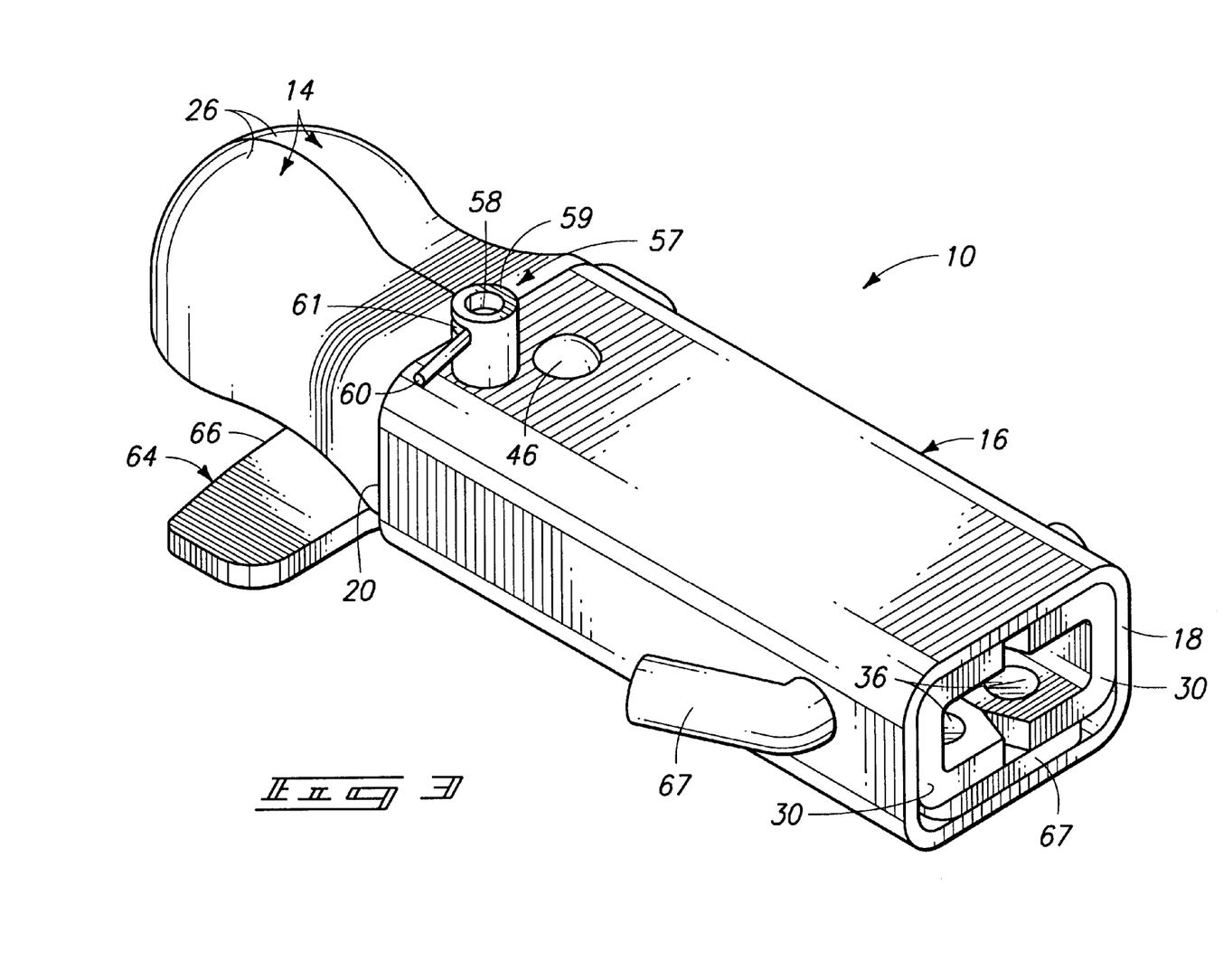
FIG. 3 is a view similar to FIG. 2 only showing the preferred coupler from a different angle.

The arms 28 and hitch sockets 26 are slidably received for longitudinal movement within the base member 16. In preferred forms, rearward arm ends 30 are configured when laterally juxtaposed to conform with the interior configuration of the base member as shown in FIGS. 2–4.

Figure 4:
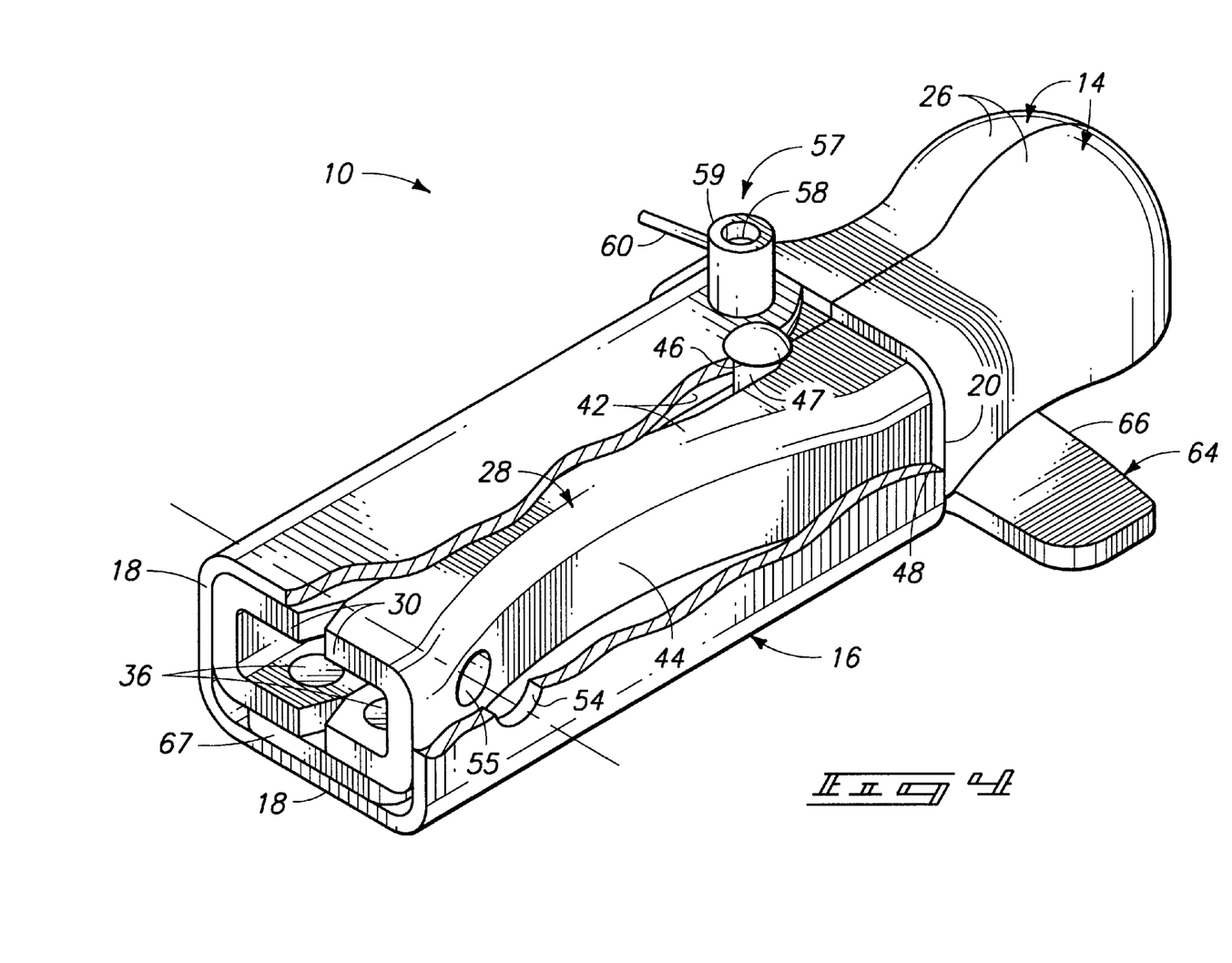
FIG. 4 is a fragmented perspective view.
Figure 5:
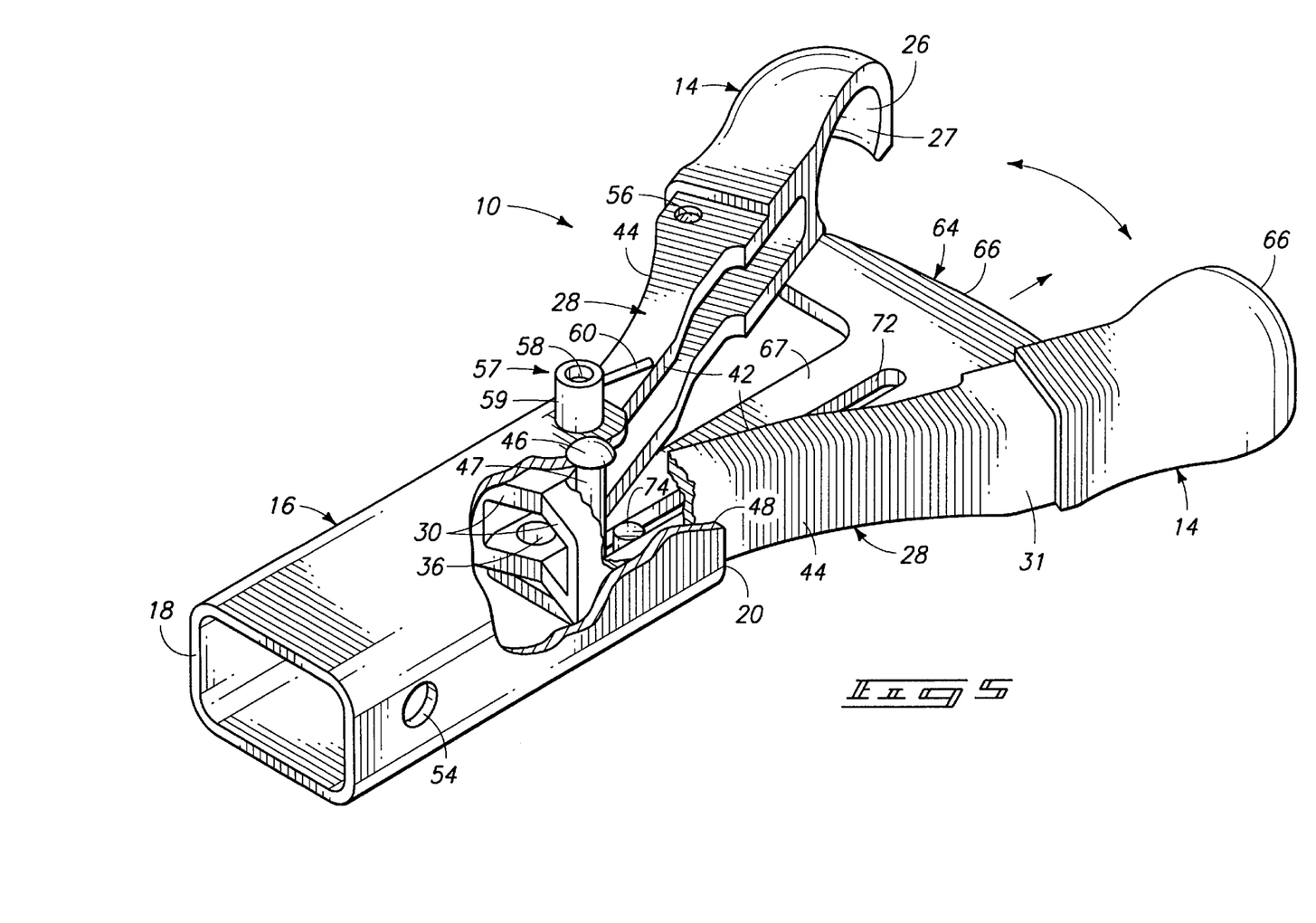
FIG. 5 is a partially fragmented perspective view similar to FIG. 4 only showing the hitch capturing members in an open hitch receiving position.
Figure 6:
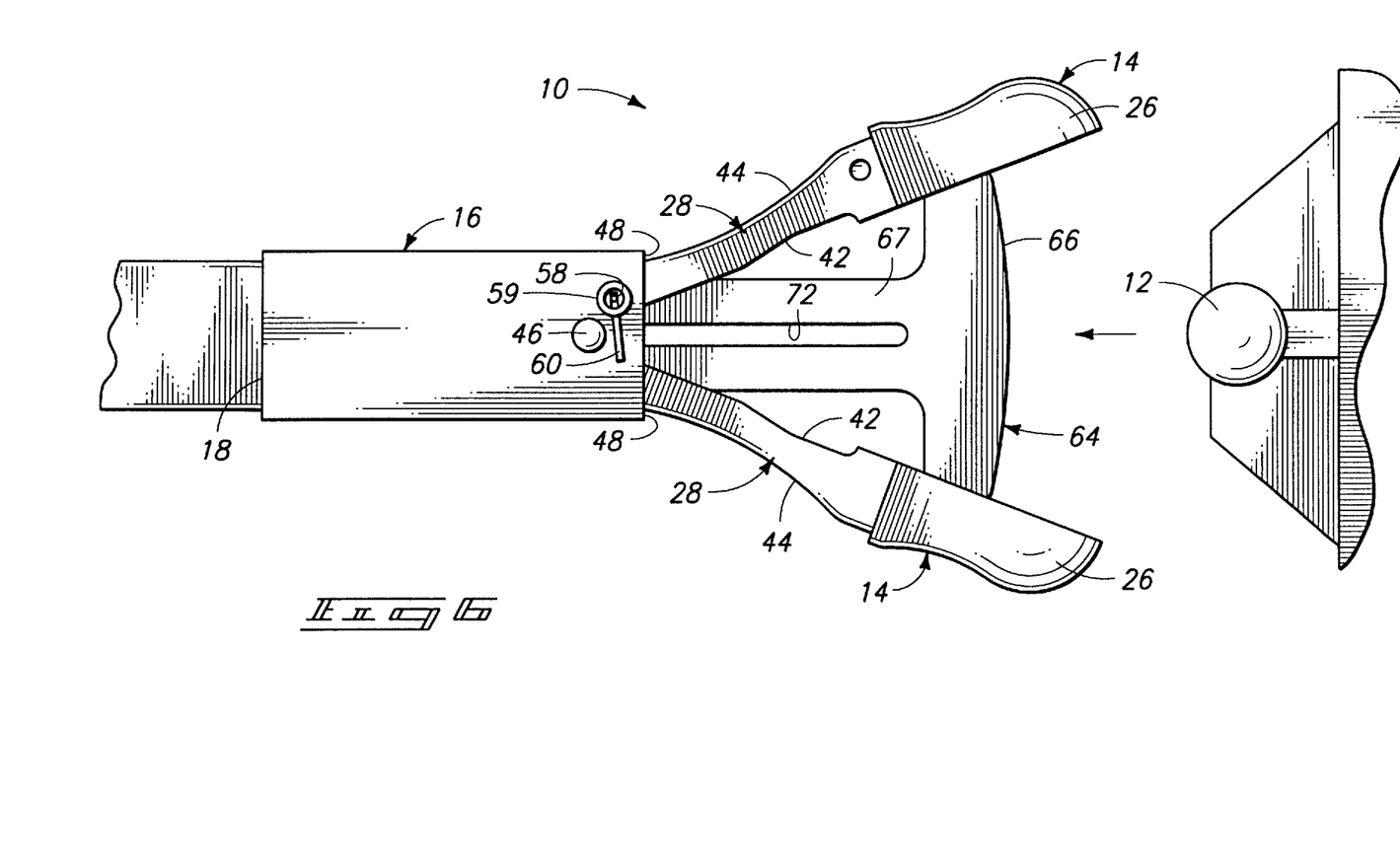
FIG. 6 is a top plan view showing the hitch capturing members in the open hitch receiving position and a hitch approaching in a rearward direction.

It is also preferred that the rearwardly extending arms 28 include a hinge link 32 (FIGS. 4, 5). The hinge link 32 joins the arms for pivotal movement between a hitch receiving position (FIG. 5) and a hitch engaging position (FIG. 2). In more specific forms, the hinge links 32 join the hitch capturing members 14 to the positioner for pivotal movement and for longitudinal movement in forward and rearward directions with respect to the base member 16.

An exemplary form of the hinge link assembly 32 is shown in FIG. 1 (disassembled) and in FIGS. 2–5 (assembled), comprising a pair of hinge pins 36 on one of the hitch capturing members, and mating sockets 38 (FIG. 1) on the positioner 64 that pivotably receive the hinge pins 36. The interfitting pin member 36 and socket 38 permit relative pivotal movement of the hitch capturing members 14 about axes that are normal to top and bottom surfaces of the base member 16.

The interfitting pin and socket members 36 and 38 also prevent longitudinal forward or rearward movement of the hitch capturing members relative to one another and to the positioner member 64, yet permit all three members to slide longitudinally in the base member 16. The hitch capturing members 14 also spread apart and come together about the axes during such longitudinal motion.

In the illustrated embodiments, first and second cam surfaces 42, 44 are provided on each of the hitch capturing members 14. It is advantageous that the cam surfaces 42, 44 be formed integrally with the arms 28.

The preferred first cam surfaces 42 are positioned along the arms 28 and face one another. The surfaces 42 are recessed into the arms and straddle a first cam actuator 46 (FIGS. 1 and 4).

The first cam actuator 46 is mounted to the tubular base member 16 and is positioned in slidable engagement with the first cam surfaces 42. The first cam actuator 46 functions to spread the hitch capturing members laterally apart at the forward hitch socket parts 26 to the hitch receiving position (FIG. 5) in response to longitudinal movement of the hitch capturing members in a forward direction to a hitch receiving position.

The first cam actuator 46 may be provided as a pin 47 (FIGS. 1, 4) that extends through the base member 16, rearwardly adjacent the forward open end 20. It is advantageous that the pin be removable to enable disassembly of the coupler 10 for maintenance or repair as needed. The pin 47 is substantially centered laterally in the open channel formed by the base and is preferably vertically oriented.

In preferred forms, as the hitch capturing members 14 are drawn forwardly from the base member 16, the first cam surfaces 42 come into contact with the pin 47 and progressively spread the capturing members 14 apart. The spreading motion occurs uniformly about the axes of the hinge link assembly 32 (which is also moving forwardly) until the rearward ends of the arms 28 bind against one another (FIG. 5) Once this occurs, the hitch capturing members 14 will not spread any further. As may also be seen in FIG. 5, the pin 47 will also function to prevent the hitch capturing members from sliding any further from the base member 16.

The second cam surfaces 44 are positioned along the arms 28 and face outwardly to opposite lateral sides of the arms 28. They are formed as arcuate recesses in the arms to perform a dual function. First, the recessed second cam surfaces 44 provide clearance to allow the hitch sockets 26 to spread laterally as the hitch capturing members are moved forwardly to the extended open position (by action of the first cam actuator 46 and first cam surfaces 42). Secondly, they interact with the second cam actuator 48 to close the hitch capturing members as the hitch capturing members are moved rearwardly.

The preferred second cam actuator 48 is provided as rounded vertical edges formed by the open forward end 20 of the base member 16. The edges are spaced apart by the width of the base member 16 and will be slidably engaged by the second cam surfaces 44 as the hitch capturing members are moved rearwardly. The second cam actuator 48 and second cam surfaces 44 thus function to close the hitch capturing members 14 laterally to a hitch engaging position (FIGS. 2, 3) as the members 14 move rearwardly.

The hitch capturing members 14 are locked against lateral separation by the base member 16 in the hitch engaging position. The only way the hitch capturing members 14 will allow release of an engaged hitch 12 is if the members 14 are allowed to slide forwardly to the open position. This action may be selectively prevented by a lock pin 52.

In preferred embodiments, the base member 16 and hitch capturing members 14 include lock pin receiving openings 54, 55 respectively (FIGS. 1, 4). The base member lock pin openings 54 are formed through the base 16 adjacent the rearward base end 18 and are aligned across the longitudinal central opening therein.

The hitch capture member openings 55 are formed through the capture members 14 and are located toward the rearward ends 30 of the arms 28. The openings 55 will align with the base member openings 54 when the hitch capturing members 14 are situated at the hitch engaging position.

The aligned openings 54, 55 releasably receive the lock pin 52. The pin 52 may be inserted through the openings 54, 55 to selectively lock the hitch capturing members in the hitch engaging position against longitudinal movement relative to the base member 16. The base member 16 also functions at this time to lock the hitch capturing members 14 against lateral separation. A hitch 12 captured by the hitch sockets 26 is thereby secured against release.

A safety latch arrangement 57 is provided in preferred forms of the coupler 10. The latch arrangement 57 is provided in addition to the lock pin arrangement described above, to prevent unintentional opening of the hitch capture members even when the lock pin 52 is pulled.

Figure 11:
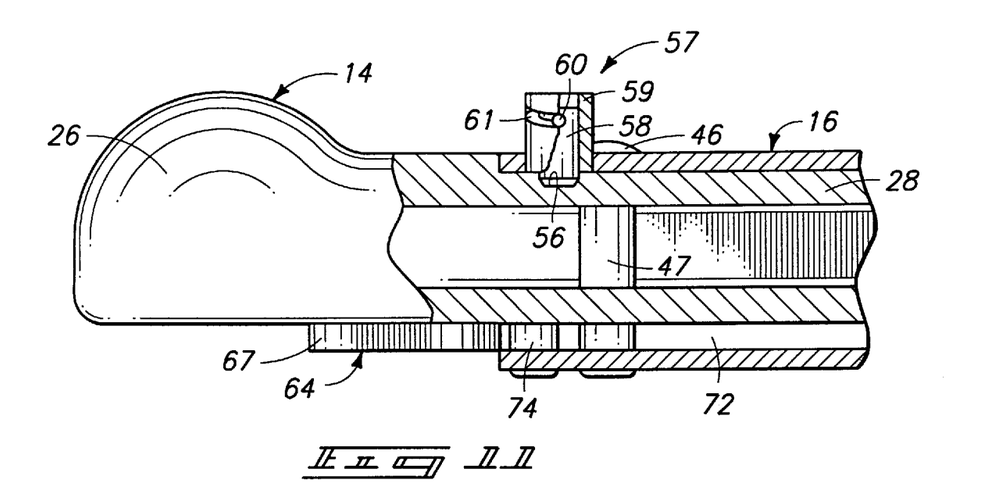
FIG. 11 is a fragmented side elevational view showing a safety latch arrangement engaged with one of the hitch capturing members.

The safety latch arrangement 57 is preferably comprised of a latch pin 58 that is received in an indentation 56 formed in one of the hitch capture members 14 at the forward arm end 31. The pin 58 slides in a bushing 59 that is affixed to the base 16. A lever 60 projects from the latch pin 58 through an angled slot 61 that is formed in the bushing. Rotation of the lever 60 in the angled slot 61 will result in elevational movement of the latch pin 58.

A user may manually rotate the lever 60 to lift the pin 58 from engagement with the indentation 56, thereby allowing the hitch capture members 14 to slide longitudinally outward. When the members 14 are returned to the closed positions, the pin 58 will automatically drop back into the indentation 56 to prevent unintentional movement of the capture members 14, even if the lock pin 52 is not in position.

In preferred forms of our invention, the hitch positioner 64 is provided to be slidable with the hitch capturing members 14 rearwardly adjacent the hitch sockets 26. The positioner 64 is used to span the space between the hitch socket parts 26 when they are in the hitch receiving position (FIG. 6) and provides an abutment surface and guide for the hitch 12.

The preferred positioner 64 is formed in a "T" shape with a cross part forming the abutment surface 66. A leg part of the positioner extends into the tubular base and is formed as a rigid bar 67. The bar 67 is slidably received in the base member 12 under the hitch capture members 14.

The rearward end of the bar 67 includes bores or indentations 38 that mount the hinge pins 36. The positioner 64 is thereby connected to the hitch capture members for forward and rearward movement relative to the base 16.

The arcuate hitch engaging abutment surface 66 is formed across the cross part of the "T" shape, and spans the distance between the socket parts 26 when the hitch capture members are in the open hitch receiving position (see FIG. 5). A rearward moving hitch 12 may contact the surface 66 at any point between the socket parts 26 and cause corresponding rearward movement and closure of the hitch capture members 14.

The leg part 67 includes a longitudinal slot 72 that slidably receives the first cam surface actuator 46. The same slot 72 also slidably receives an alignment pin 74 (FIGS. 5 and 11) that is located on the base 16 in longitudinal alignment with the first cam surfaces 42. The alignment pin 74 is slidably engaged within the longitudinal slot 72 and cooperates with the first cam surface actuator 46 to hold the positioner and hitch capture members against lateral shifting, especially when at the extended, open position.

It is noteworthy that the pin 52 may be used with a conventional padlock (not shown). This arrangement could be used to lock the hitch capturing members in the closed position for security purposes. The user may thus elect to lock the coupler (and attached towed vehicle) to a towing vehicle. Alternatively, the user may elect to lock the hitch capturing members in the closed position to prevent the coupler from being attached to a towing vehicle.

Operation of the present coupler 10 will be described assuming the coupler is mounted to the towing tongue of a trailer type vehicle, and an appropriate hitch is affixed in a conventional manner to a towing vehicle. The steps taken to connect the coupler and hitch will be described, followed by a description of the steps taken to disconnect the coupler and hitch. It will also be assumed the starting condition will be with the coupler in the closed and locked condition as shown in FIG. 2.

Operation of the present coupler may be preceded, if necessary, by adjustment of the coupler elevation to match that of the hitch. This may be done by measuring the height of the hitch on the towing vehicle, then making appropriate adjustments (using conventional lifting apparatus) on the trailing vehicle to match the hitch elevation. It is preferred that the abutment surface 66 be at the same elevation as the neck 13 of the hitch.

Once the coupler elevation has been set, no further substantial elevational adjustments need be made.

Now the user may unlock the coupler. This is done simply by pulling the lock pin 52 from engagement with the hitch capturing members and base member. The lever 60 is now turned to lift the latch pin 48 from the adjacent hitch capture member 14. The hitch capturing members 14 and positioner 64 are now freed and may be pulled forwardly.

As the user pulls the hitch capturing members 14 forwardly, the first cam surfaces 42 engage the first cam actuator 46 and progressively spread the hitch capturing members 14 apart. The rearward ends 30 of the arms 28 will bind against one another and the pin 47 once the hitch capturing members 14 have reached the fully extended open hitch receiving position as shown by FIG. 5. The coupler 10 is now ready to receive the hitch 12.

The towing vehicle (which typically has the hitch 12 on a rearward part of the frame or bumper) is now moved rearwardly to bring the hitch 12 into engagement with the positioner 64. This action is shown progressively by FIGS. 6–8. It is noted that the hitch need not be perfectly aligned with the coupler, since engagement with the positioner 64 at any location between the hitch socket parts 26 will be sufficient to initiate closing of the hitch capturing members.

As the hitch 12 continues moving rearwardly, the positioner 64 is pushed rearwardly. The positioner 64 likewise pulls the hitch capturing members 14 rearwardly (by reason of the hinge pin connections at the rearward arm ends 30).

Figure 7:
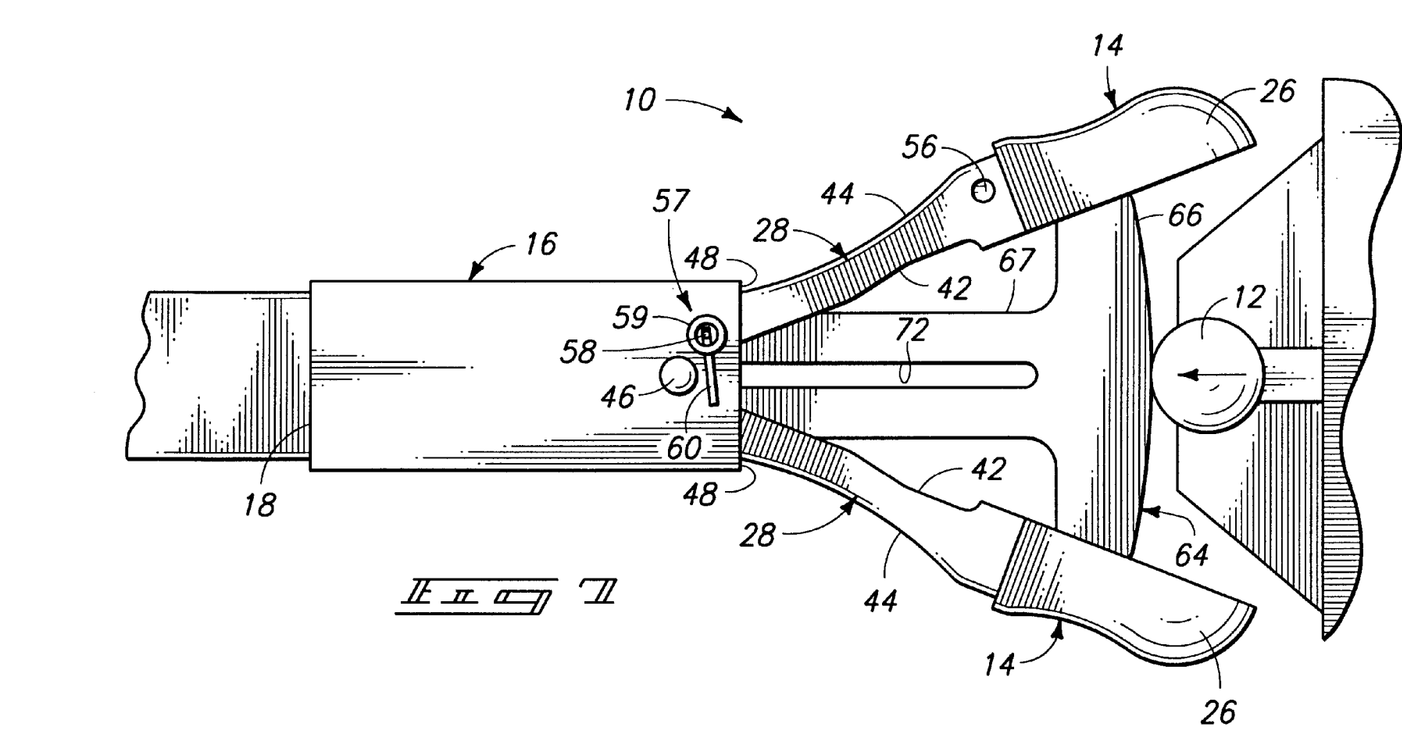
FIG. 7 is a view similar to FIG. 6 only showing the hitch engaging the positioner while moving rearwardly.
Figure 8:
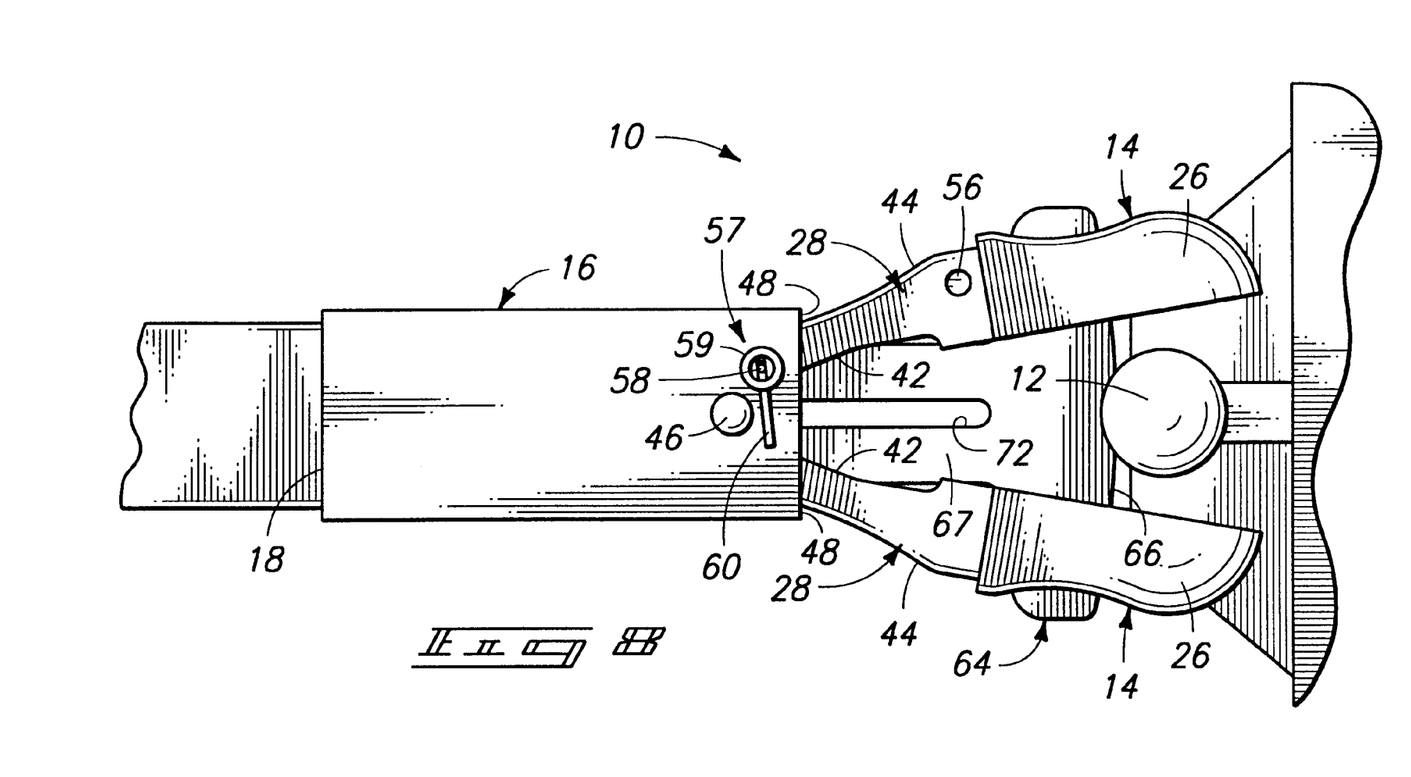
FIG. 8 is a view similar to FIG. 7 only showing the hitch pushing the positioner rearwardly and closing of the hitch capturing members.
Figure 9:
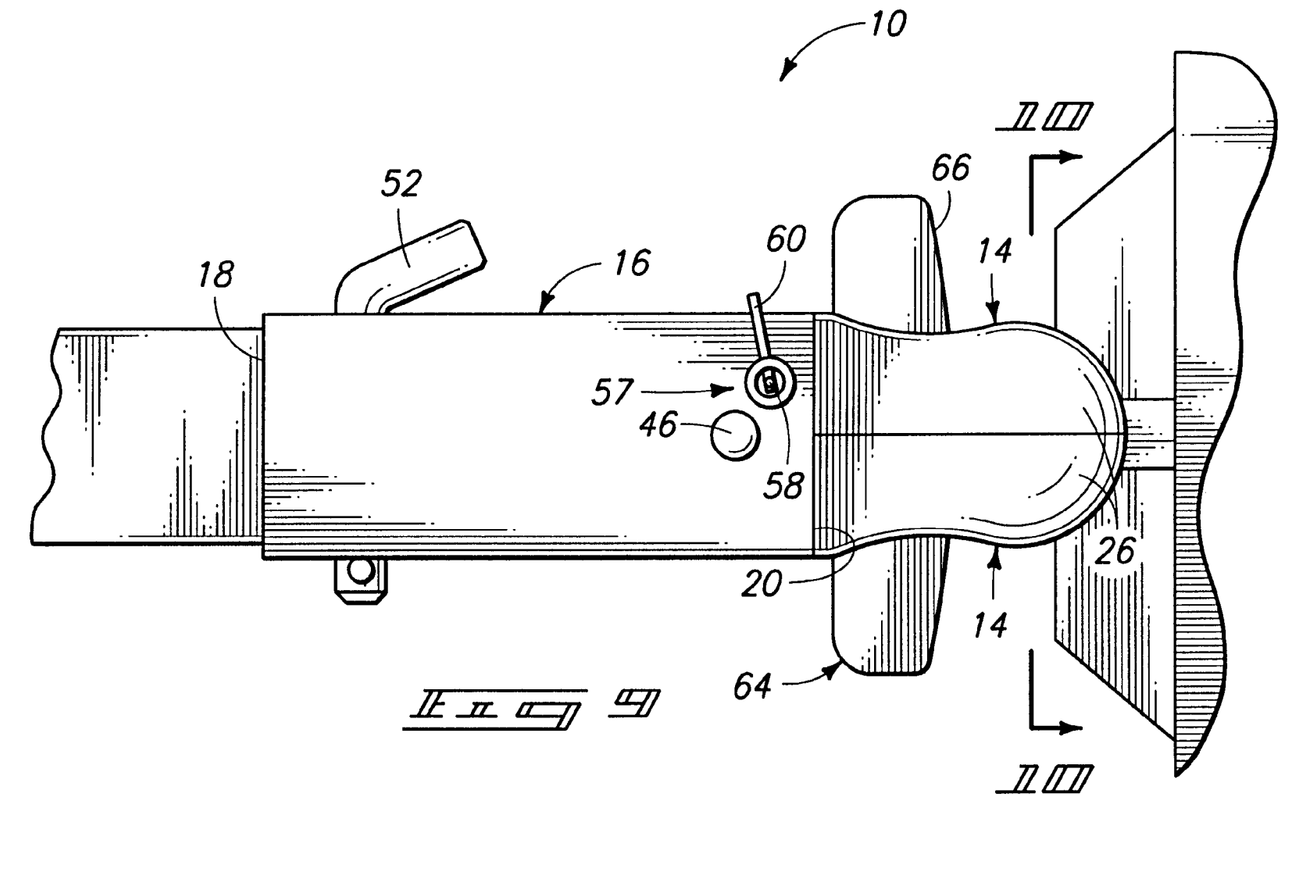
FIG. 9 is a view similar to FIG. 8 only showing the hitch capturing members closed on the hitch and the positioner repositioned with a locking pin securing the hitch capturing members in the closed position.
Figure 10:
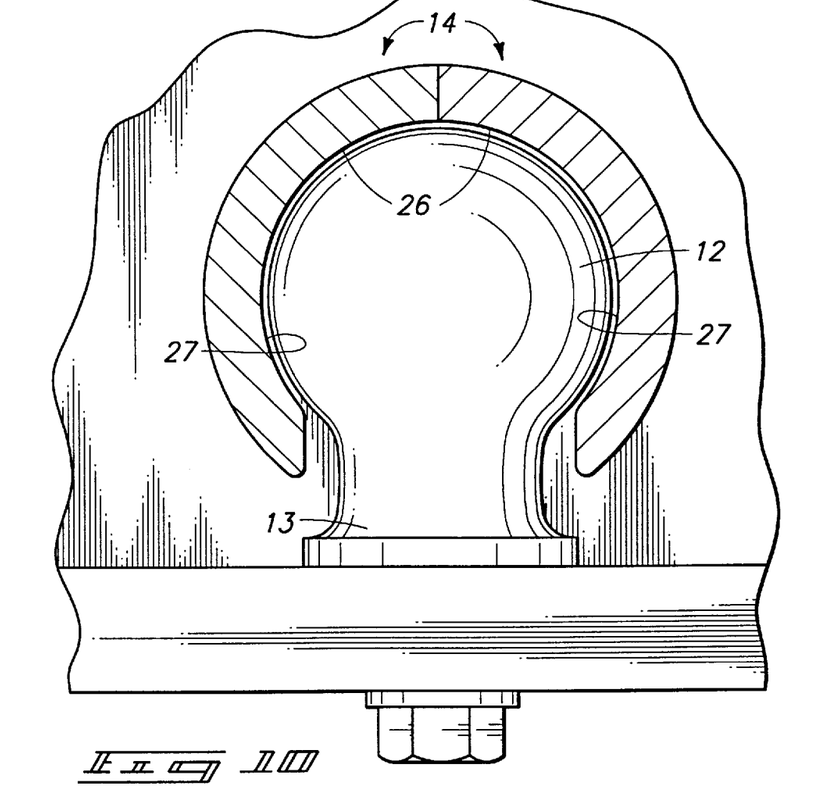
FIG. 10 is an enlarged sectional view taken substantially along line 10—10 in FIG. 9.

The rearwardly moving second cam surfaces 44 engage and slide against the second cam actuators 48 on the base member 16, progressively causing the hitch capturing members to pivot to the closed position (compare FIGS. 7 and 8). Finally, when the hitch capturing members seat against the base member (FIG. 9), the hitch capturing members will have closed and the hitch 12 will have been captured within the closed hitch socket parts 26 (FIG. 10).

If the coupler 10 is slightly out of alignment with the hitch 12, the rearward force of the rearwardly moving hitch 12 will cause one of the second cam surfaces 44 and engaged second actuator surface 48 to shift the coupler 10 into proper alignment.

When the hitch capturing members are fully closed, the latch pin 58 will fall back into the indentation 56, locking the capturing members against unintentional forward movement. The user may also insert the lock pin 52 into the presently aligned openings 54, 55 to positively lock the hitch capturing members against future longitudinal movement relative to the base member 16.

The hitch is now captured, the coupler is locked, and the towed vehicle is safely attached to the towing vehicle.

When it becomes desirable to disconnect the coupler from the hitch, the user may simply slide the lock pin 52 from the coupler, turn the latch pin lever 60 and move the vehicle and hitch 12 forwardly. The forwardly moving hitch 12 will pull the hitch members forwardly and the first cam surfaces will separate the hitch sockets 26, allowing the hitch to move freely from the coupler 10.

It is noted that the disconnect operation does not require that the coupler be adjusted elevationally. This is also true of future coupling operations. Thus the coupler needs only to be adjusted once to the elevation of the hitch and future coupling and uncoupling procedures can be accomplished with little or no elevational adjustments.

Variations (not shown) of the above preferred embodiments may be made without departing from the scope of our invention. For example, several cam surfaces and actuators are described in the preferred embodiments described above. However, the coupler 10 could be produced with just one cam surface (preferably one of the second cam surfaces 44) on at least one of the respective members 14 and an appropriate cam actuator on the base member 16. The single cam surface would act against the actuator responsive to rearward longitudinal motion of the hitch capturing members and would close the hitch capturing members from an open hitch receiving position to the retracted hitch engaging position.

It is also possible that the first cam surfaces 42 and first cam actuator 46 could be eliminated. In such an embodiment, the hitch capturing members could be pulled forwardly from the base and be manually separated.

The cam surfaces themselves could also be modified. For example, the arms could be produced with shaped longitudinal slots that could slidably receive individual actuator pins mounted on the base member to effect the same motion of the capturing members between the open and closed positions. Further, the pins could be mounted to the capturing members and the slots could be formed in the base member.

The positioner 64 might also be made integral with or attached to one of the hitch capturing members, and be slidably engaged with the other. The positioner operation would be similar, except that the positioner would project to one side of the coupler in the closed hitch engaging position.

Still other variations may also be envisioned that fall within the scope of the appended claims.

Thus, in compliance with the statute, the invention has been described in language more or less specific as to structural and methodical features. It is to be understood, however, that the invention is not limited to the specific features shown and described, since the means herein disclosed simply comprise presently preferred examples of putting the invention into effect. The invention is, therefore, claimed in any of its forms or modifications within the proper scope of the appended claims appropriately interpreted in accordance with the doctrine of equivalents.

What is claimed is:

1. A trailer coupler, comprising:
   a pair of elongated hitch capturing members, each having a hitch socket part at a forward end;
   a base member mounting the hitch capturing members for selective movement forward and rearwardly between a forwardly extended and open hitch receiving position wherein the hitch socket parts are separated and a rearwardly retracted and closed hitch capturing position wherein the hitch socket parts are closed together;
   a hitch positioner member movably mounted to the base member and including a hitch abutment surface positioned between the hitch capturing members in the forwardly extended and open hitch receiving position;
   the hitch positioner member being movably positioned for forward and rearward movement with respect to the base and connected to at least one of the hitch capturing members to move the hitch capturing members rearwardly in response to engagement by a rearwardly moving hitch; and
   interacting cam surfaces on at least one of the hitch capturing members and base member responsive to rearward motion of the hitch capturing members to move the hitch capturing members to the closed hitch capturing position responsive to rearward movement of the hitch capturing members.

2. A trailer coupler as defined by claim 1 wherein said interacting cam surfaces include a cam actuator situated on the base member that is positioned to act against a cam surface on at least one of the hitch capturing members to close the hitch capturing members responsive to rearward movement of the hitch capturing members relative to the base member.

3. A trailer coupler as defined by claim 1, further comprising at least one hinge link pivotably joining at least one of hitch capturing members and positioner for movement between the hitch receiving position and the hitch capturing position.

4. A trailer coupler as defined by claim 1, further comprising hinge link pins pivotably joining the hitch capturing members to the hitch positioner member for movement between the hitch receiving position and the hitch capturing position.

5. A trailer coupler as defined by claim 1, wherein the base member and hitch capturing members include lock pin receiving openings that are aligned at the hitch capturing position, and further comprising a lock pin releasably receivable within the lock pin receiving openings.

6. A trailer coupler as defined by claim 1, further comprising a safety latch assembly on the base member and positioned thereon to releasably lock the hitch capturing members against longitudinal movement with respect to the base.

7. A trailer coupler: comprising
   an elongated tubular base member having a forward open end and a rearward end, configured for attachment to a trailer;
   a pair of elongated hitch capturing members, each including a forward hitch socket part and a rearwardly extending arm slidably received for forward and rearward longitudinal movement within the base member;
   at least one of the arms including a first and a second cam surface;
   a first cam actuator on the base member positioned in slidable engagement with the first cam surface to spread at least one of the hitch capturing members laterally apart from the remaining hitch capturing member to a hitch receiving position responsive to forward movement of the hitch capturing members relative to the base member;
   a second cam surface actuator on the base member positioned for slidable engagement with the second cam surface to close the at least one hitch capturing member laterally toward the remaining hitch capturing member to a hitch engaging position in response to rearward movement of the hitch capturing members relative to the base member; and
   a hitch positioner including an abutment surface spanning the hitch capturing members rearwardly adjacent the hitch socket parts and connected to the hitch capturing members for forward and rearward movement with the hitch capturing members.

8. A trailer coupler as defined by claim 7, wherein the hitch positioner is slidably engaged with the hitch capturing members rearwardly adjacent the hitch socket parts and spanning a space between the hitch socket parts in the hitch receiving position.

9. A trailer coupler as defined by claim 7, wherein the first cam surface actuator is comprised of a pin mounted to the base member and positioned between the hitch capturing members.

10. A trailer coupler as defined by claim 7, wherein the second cam surface actuator is comprised of an end edge surface on the base member at the forward open end.

11. A trailer coupler as defined by claim 7, wherein the rearwardly extending arms include a hinge link pivotably joining the arms for movement between the hitch receiving position and the hitch engaging position.

12. A trailer coupler as defined by claim 7, wherein the rearward extending arms include a hinge link pivotably joining the arms to the hitch positioner for movement between the hitch receiving position and the hitch engaging position.

13. A trailer coupler as defined by claim 7, wherein the base member and hitch capturing members include lock pin receiving openings that are aligned at the hitch engaging position, and further comprising a lock pin releasably receivable within the lock pin receiving openings.

14. A trailer coupler comprising
   a tubular base having a forward open end and a rearward end, configured for attachment to a trailer;
   a pair of elongated hitch capturing members, each including a forward hitch socket part and a rearwardly extending arm slidably received for longitudinal movement within the tubular base;
   at least one of the arms including a first cam surface and a second cam surface;
   a first cam surface actuator on the tubular base positioned in slidable engagement with the first cam surface to spread the hitch capturing members laterally apart relative to one another at the forward hitch socket parts to a hitch receiving position responsive to longitudinal movement of the hitch capturing members in a forward direction with respect to the tubular base;
   a second cam surface actuator on the tubular base positioned for slidable engagement with the second cam surface to move the hitch capturing members laterally together at the forward hitch socket parts to a closed hitch engaging position responsive to longitudinal movement of the hitch in a rearward direction with respect to the tubular base;
   a positioner member mounted to at least one of the hitch capturing members and having an abutment surface positioned to span the hitch socket parts in the forwardly extended and open hitch receiving position to engage a rearwardly moving hitch and move the hitch capturing members rearwardly in response to the rearwardly moving hitch; and
   wherein the hitch capturing members and positioner members are interconnected such that rearward movement of one of the members will cause similar movement of the remaining members.

15. A trailer coupler as defined by claim 14, wherein the positioner member is "T" shaped with a cross part including the abutment surface and a leg part extending into the tubular base.

16. A trailer coupler as defined by claim 14, wherein the positioner member is "T" shaped with a cross part including the abutment surface and a leg part extending into the tubular base; and
   wherein the rearwardly extending arms are pivotably mounted to the leg part of the positioner member.

17. A trailer coupler as defined by claim 14, wherein the positioner member is "T" shaped with a cross part including the abutment surface and a leg part extending into the tubular base; and
   wherein the rearwardly extending arms are pivotably mounted to the leg part of the positioner member;
   wherein the leg part includes a longitudinal slot slidably receiving the first cam surface actuator; and
   an alignment pin on the base in longitudinal alignment with the first cam surface and slidably engaged within the longitudinal slot to hold the positioner member laterally stable.

18. A trailer coupler as defined by claim 14, further comprising:
   a lock pin; and
   wherein the base member and hitch capturing members include lock pin receiving openings that are aligned at the hitch engaging position and configured to receive the lock pin.

19. A trailer coupler as defined by claim 14, wherein the positioner is "T" shaped, with a cross part positioned rearwardly of and slidably supporting the socket parts.

20. A trailer coupler as defined by claim 14, wherein the positioner is "T" shaped, with a cross part positioned rearwardly of and slidably supporting the socket parts; and wherein the abutment surface is comprised of a convex forwardly facing arcuate surface.

21. A trailer coupler as defined by claim 14, further comprising:
   a lock pin;
   lock pin receiving openings formed in the hitch capturing members and the base member that are aligned at the hitch engaging position and configured to receive the lock pin;
   wherein the positioner is elongated and is pivotably connected to the hitch capturing members within the tubular base for forward and rearward movement therewith.

* * * * *

UNITED STATES PATENT AND TRADEMARK OFFICE
CERTIFICATE OF CORRECTION

PATENT NO. : 6,224,084 B1
DATED : May 1, 2001
INVENTOR(S) : Ross Allen Ray et al.

It is certified that error appears in the above-identified patent and that said Letters Patent is hereby corrected as shown below:

<u>Column 4,</u>
Line 63, delete paragraph separating "shown by" and "FIGS. 6-9)".

Signed and Sealed this

Twenty-ninth Day of January, 2002

Attest:

Attesting Officer

JAMES E. ROGAN
*Director of the United States Patent and Trademark Office*